July 3, 1928.  1,675,524
L. ZAJAC
ROTARY COMPRESSOR OR MOTOR
Filed Sept. 30, 1927  3 Sheets-Sheet 1
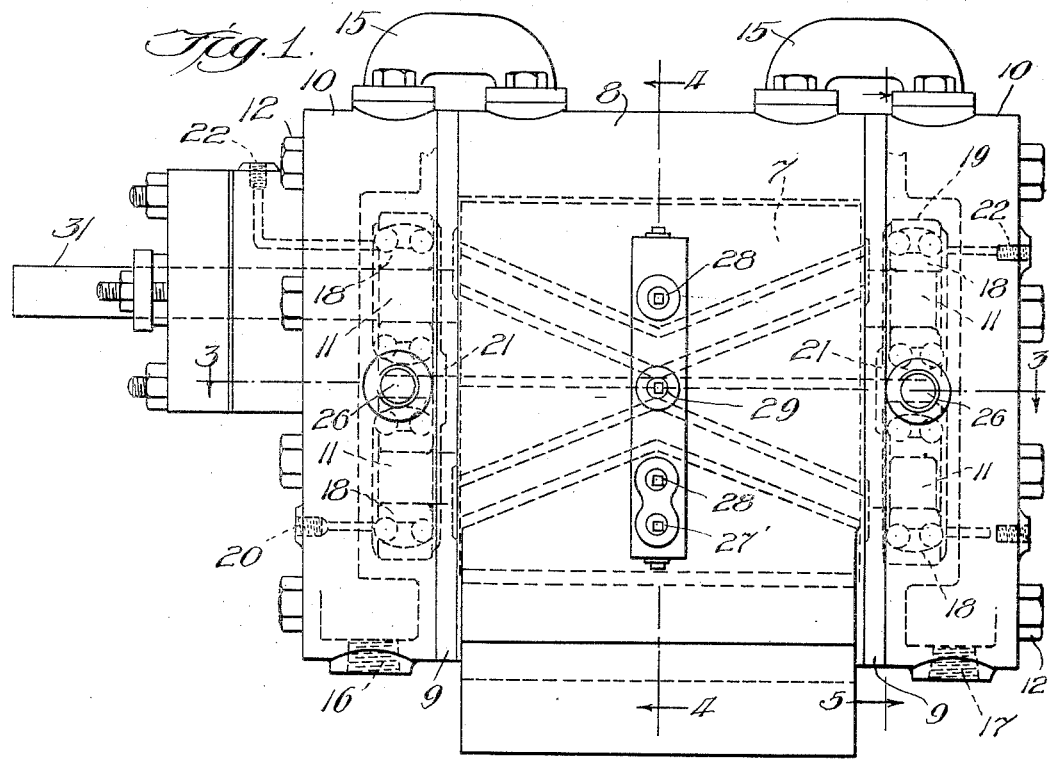
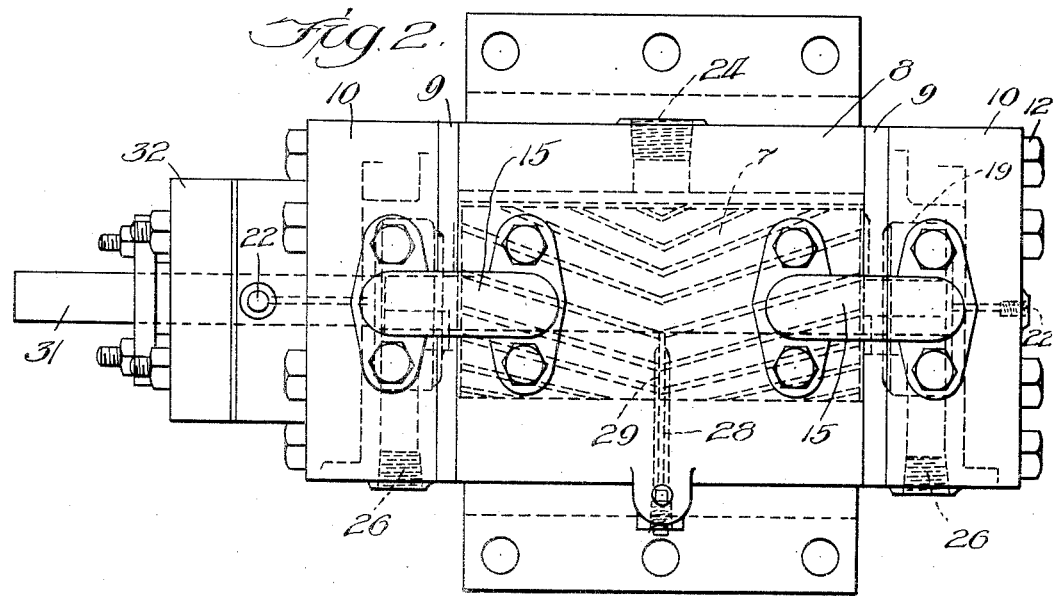
Inventor:
Leopold Zajac,
By Wm. F. Freudenreich,
Atty

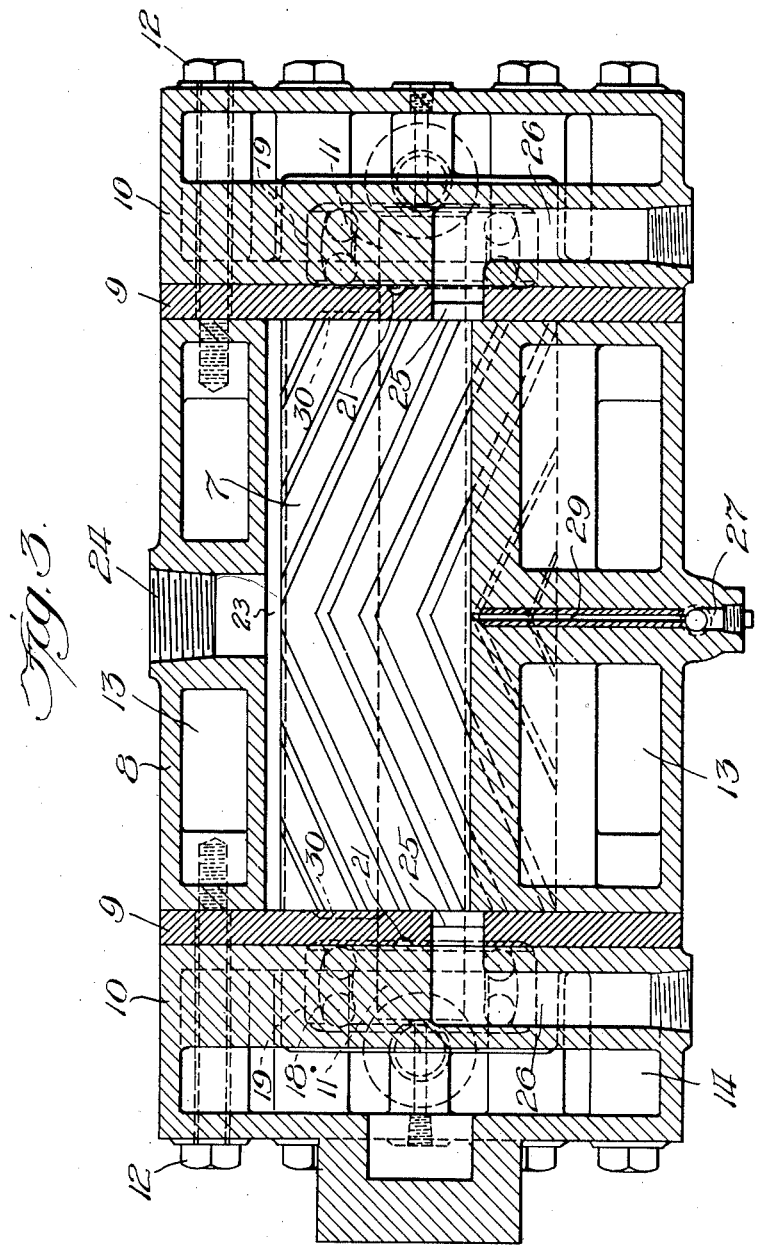

July 3, 1928.
L. ZAJAC
1,675,524
ROTARY COMPRESSOR OR MOTOR
Filed Sept. 30, 1927    3 Sheets-Sheet 3
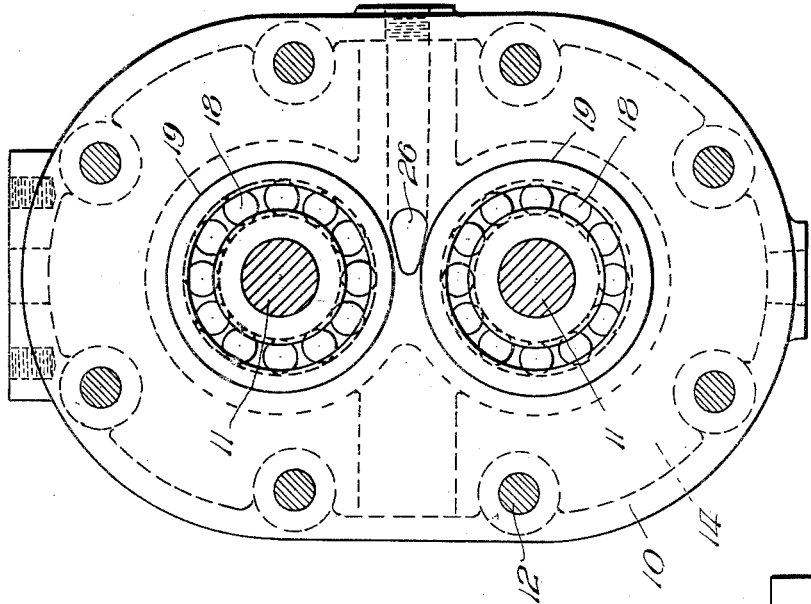
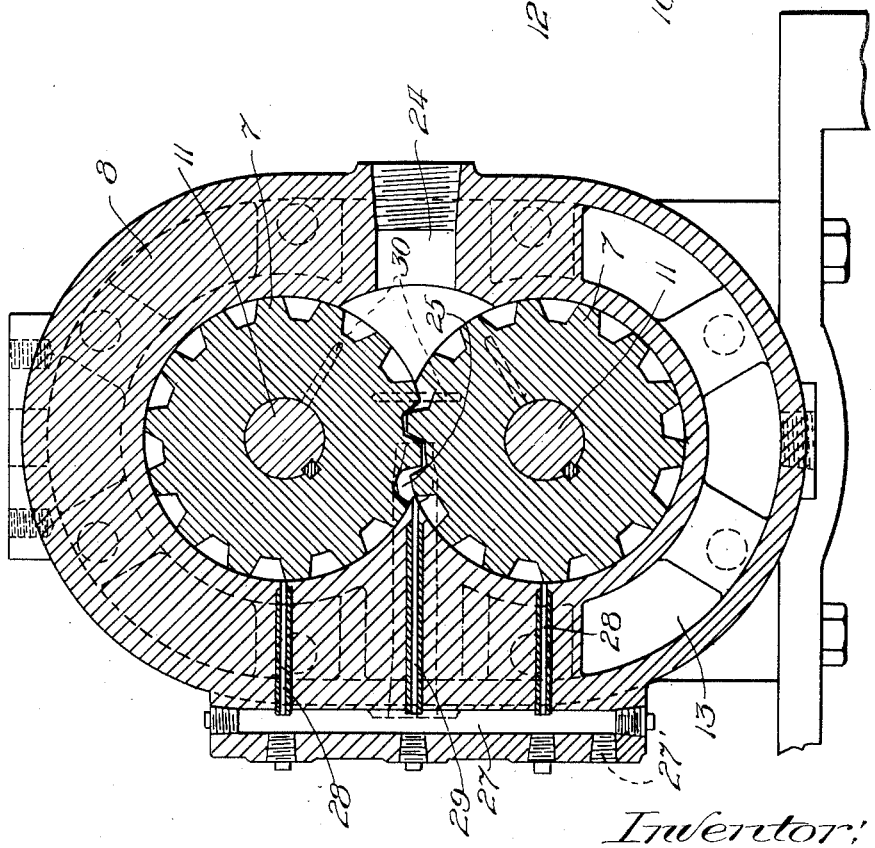
Inventor;
Leopold Zajac,
by Wm F Freudenreich,
Att'y Patented July 3, 1928.

1,675,524

UNITED STATES PATENT OFFICE.

LEOPOLD ZAJAC, OF MILWAUKEE, WISCONSIN.

ROTARY COMPRESSOR OR MOTOR.

Application filed September 30, 1927. Serial No. 222,992.

The invention relates to compressors or pumps of the rotary intermeshing gear type, which may also be modified and used as rotary engines; and has for its object to improve the operating efficiency thereof. Specifically considered the invention relates to that type of compressor or motor wherein a sealing fluid cooperates with the gears and casing to effect the compression or exhaustion of a gas such as air or a refrigerant gas, and may be said to have for its object an improved method of introducing the sealing fluid, the lubrication of the bearings, the sealing of the ends of the gears and other improved features hereinafter more particularly described and claimed.

In the drawings Fig. 1 is a side elevation of a compressor or pump embodying the invention; Fig. 2 is a plan view thereof;
Fig. 3 is a detail sectional view taken on the line 3—3 of Fig. 1; Fig. 4 is a detail sectional view taken on the line 4—4 of Fig. 1; Fig. 5 is a detail view of one of the end plates of the gear housing viewed along the line 5—5 of Fig. 1.

In the drawings the numeral 7 designates gears, preferably of the herringbone type, which are arranged in intermeshing relation within a housing formed by a casing 8 and end plates 9; said gears having a working fit within the casing, as is usual in gear type pumps. 10 represents the bearing housings for the shafts 11 on which the gears are mounted, these parts being retained in assembled relation by bolts 12 passing through the housing 10 and plates 9 into the threaded holes in the ends of the casing 8. The casing 8 has a cooling jacket space 13 and the housings 10 a cooling jacket space 14, which spaces are connected in pairs by pipes 15. The water or other cooling fluid enters through a port 16 in the lower end of space 14 in one of the housings 10 and passes therethrough and through one of the pipes 15 to space 13 and thence through the other pipe 15 to the top of the space 14 of the other housing. The cooling fluid discharges from the latter housing through a port 17 connected with the lower end of the space 14 therein.
Referring more particularly to Figs. 1 and 3 it will be noted that each gear shaft 11 is journalled in a ball bearing journal 18 and that these journals are mounted in recesses 19 in the housings 10. For lubricating the bearings in each instance the lubricant is introduced into the housing adjacent the lower bearing, from a suitable source of pressure supply, through a port 20 in said housing, finds its way out of said bearing through a transfer port 21 formed in the end plate and passes from the upper bearing through a port 22 in said housing. This lubricant is under the same pressure as the pump delivery pressure and is being continuously circulated through the bearings, which is very important to the efficient operation of the compressor.

The general operation of compressors of this character is well known, that is, the gas to be compressed enters the inlet 24 and is carried between the teeth and the casing around toward the opposite side of the casing where it is discharged; being compressed between the teeth of the gears before it is discharged; and there being a sealing fluid introduced between the teeth during the travel of the gas from inlet to outlet.

As is usual in gear type compressors or pumps, the gas to be compressed is conducted into the casing 8 into the space 23 between the gears on one side of the line of intermesh and is exhausted from the casing on the other side of their region of meshing; and, since when herringbone gears are used their intermeshing action naturally takes place first at the center and then proceeds along the tooth line of the gears toward their ends, the inlet port 24 communicates with the space 23 at the center of the casing 8 while the exhaust ports 25 are formed in the end plates and communicate with discharge passages 26 formed in the bearing housings.

For supplying the sealing liquid I provide a conduit 27 having an inlet 27' receiving the lubricant or other sealing liquid at compressor discharge pressure and located centrally of the compressor casing; and from this conduit I provide ducts 28 entering the casing at the side of the compressor opposite the inlet side. These ducts open into the casing, respectively, about ninety degrees in advance of the line of center passing through the region of intermesh of the gears, with respect to one gear and about ninety degrees behind such line with respect to the other gear. I provide, in addition, a centrally disposed duct 29 which discharges directly between the gears as they start to intermesh at their central portions, that is, at the apices of their teeth. I find that this arrangement introduces the sealing fluid in a manner to insure efficient compression because of its introduction at points where the gas is at suction pressure and just before the teeth start to intermesh at their apices. Consequently, the fluid and gas, by the continued intermeshing of the gears, are squeezed or compressed laterally along the gear teeth until, at the final stage of the intermesh of the end portions of the gears, the compressed refrigerant or other gas, together with the sealing fluid, is discharged into the ports 25 and thence to passages 26. By carefully gauging the size of the discharge ends of the ducts 28 and 29 in accordance with the speed and compressor volume, the proper amount of sealing fluid will be introduced between the teeth of the gears and the casing.

It is essential that the ends of the gears have a close working fit with the end plates 9, that these surfaces be lubricated, and that the end thrust between the gears be taken care of. This end is attained by reason of the fact that some of the sealing fluid is forced out between the ends of the gears and the end plates 9 on the discharge, and is permitted to work back into the suction side through the grooves 30 extending in the plates 9 from the shaft openings to the suction side.

As is usual in gear type compressors, one of the shafts 11 has an extension 31 passing through a stuffing box 32 of known construction and therefore not shown in detail. The extension is adapted to receive the pulley, gear or other suitable means for connection with a source of power whereby the gears are rotated and accomplish their pumping action.

It will be evident that if fluid entering the inlet port 24 is under pressure, it will serve to drive the gears, so that power may be delivered through the shaft 31; the compressor then acting as a motor or rotary engine.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In a device of the character described, the combination with a casing and a pair of intermeshing herringbone gears working therein, said casing having a centrally disposed inlet on one side and exhaust outlets at the ends of said gears where the end portions of the teeth of said gears intermesh, of means for introducing a sealing liquid into said casing including a centrally disposed duct for discharging a sealing liquid into the space immediately adjacent the position in which the apices of said gears start to intermesh.

2. In a device of the character described, the combination with a casing and a pair of intermeshing herringbone gears working therein, said casing having a centrally disposed inlet on one side and exhaust outlets at the ends of said gears where the end portions of the teeth of said gears intermesh, of means for introducing a sealing liquid into said casing comprising a centrally disposed duct for discharging a sealing liquid into the space immediately adjacent the position in which the apices of said gears start to intermesh, and ducts substantially aligned with said central duct and discharging sealing fluid respectively into the space between each gear and said casing into the apical region of each gear shortly before the gears receive sealing fluid from said first named duct.

3. In a device of the character described, the combination with a casing and a pair of intermeshing gears working therein, said casing including end plates, bearing housings adjacent said end plates and provided with spaced bearings, anti-friction bearings for the shafts of said gears mounted in said housings, said end plates and housing having exhaust passages formed therein and lubricant transfer ports therebetween on the opposite side of the line of centers of the gears from said exhaust passages, each housing having a lubricant inlet duct communicating with one end of one of said bearings and an outlet duct for the lubricant leading from the opposite end of the other of said bearings.

In testimony whereof, I sign this specification.

LEOPOLD ZAJAC.